United States Patent [19]

Greenspan et al.

[11] Patent Number: 5,895,492

[45] Date of Patent: Apr. 20, 1999

[54] PROCESSOR ASSOCIATED BLOCKING SYMBOL CONTROLS FOR SERIALIZING THE ACCESSING OF DATA RESOURCES IN A COMPUTER SYSTEM

[75] Inventors: Steven Jay Greenspan, Hyde Park; Casper Anthony Scalzi; Kenneth Ernest Plambeck, both of Poughkeepsie, all of N.Y.

[73] Assignee: International Business Machines Corporation, Armonk, N.Y.

[21] Appl. No.: 08/864,585

[22] Filed: May 28, 1997

[51] Int. Cl.⁶ .................................................. G06F 12/00
[52] U.S. Cl. ........................ 711/147; 711/152; 711/164
[58] Field of Search .............................. 711/150, 152, 711/144, 149, 147, 164; 395/376

[56] References Cited

U.S. PATENT DOCUMENTS

| | | | |
|---|---|---|---|
| 4,851,990 | 7/1989 | Johnson et al. | 395/280 |
| 5,081,572 | 1/1992 | Arnold | 711/163 |
| 5,142,676 | 8/1992 | Fried et al. | 711/152 |
| 5,333,297 | 7/1994 | Lemaire et al. | 395/500 |
| 5,410,697 | 4/1995 | Baird et al. | 711/152 |
| 5,488,729 | 1/1996 | Vegesna et al. | 395/385 |
| 5,574,922 | 11/1996 | James | 395/561 |
| 5,590,326 | 12/1996 | Manabe | 711/150 |
| 5,623,671 | 4/1997 | Ando et al. | 395/726 |
| 5,636,361 | 6/1997 | Ingerman | 711/150 |
| 5,659,711 | 8/1997 | Sugita | 711/144 |
| 5,669,002 | 9/1997 | Buch | 395/726 |
| 5,696,939 | 12/1997 | Iacobovici et al. | |

Primary Examiner—Krisna Lim

Attorney, Agent, or Firm—Marc A. Ehrlich

[57] ABSTRACT

Provides a processor CLE (CPU lock element) for each processor in a protected storage in a multi-processor computer system. Each CLE contains a blocking symbol field (called herein a PLT, program lock token, field), a lock field H, and a wait field W which is used to chain plural CLEs currently having the same blocking symbol. When the lock field H is set to a lock held state, it indicates the associated processor has exclusive rights to access a data resource unit associated with the blocking symbol in the CLE entry. When the wait field in a lock entry contains a pointer to another lock entry and the H field in the lock entry indicates a not held state, the associated processor is waiting for the resource and cannot further execute its PLO instance until it later gets set to the lock state, which is done by the processor of the prior CLE in the chain when it completes execution of its PLO instance. Each PLO instruction also has operand fields, and a function code (FC). The FC controls the manner of processing done by the PLO instance on its operands. Blocking symbols are specified by software to enable the software to utilize hardware enforced serialization of multi-processor accesses simultaneously requested for accessing the same data resource in the computer system. The plural processors may simultaneously, and at any time, initiate PLO instances for the same or different blocking symbols. When different processors simultaneously execute PLO instances having different blocking symbols, the processors may execute in parallel without conflict. But if the different processors simultaneously execute PLO instances having the same blocking symbol, the processors cannot execute in parallel without potential conflict, and the processors must serialize the execution of their PLO instances for accessing the same resource. In the latter case, their CLEs are chained through pointers in wait fields of the CLEs.

16 Claims, 4 Drawing Sheets

PROCESSOR ASSOCIATED BLOCKING SYMBOL CONTROLS FOR SERIALIZING THE ACCESSING OF DATA RESOURCES IN A COMPUTER SYSTEM

RELATED APPLICATIONS

This application is related to an application Ser. No. 08/864,402 filed on the same date as this application, entitled "Blocking Symbol Control in a Computer System to Serialize Accessing any Data Resources by Simultaneous Processor Requests".

This application incorporates by reference the entire content of application Ser. No. 08/864,402 into the subject application.

This invention provides a new way of sequencing processors making a plurality of concurrent requests on different processors using the same blocking symbol in Perform Locked Operation (PLO) instructions for serializing the concurrent requests for accessing the same resource. Concurrent requests on different processors using different blocking symbols in PLO instructions are allowed to be executed in parallel on their respective processors. Blocking symbols, herein called "Program Lock Tokens" (PLTs), provide a software controlled technique for enforcing hardware serialization of multi-processor access requests simultaneously being made for accessing the same data resource of a CEC (Central Electronic Complex).

BACKGROUND

Today parallel execution of processes is common in computer systems, and the serialization problem addressed in this application has been addressed in prior computer systems. But the prior techniques have not been as effective or able to obtain the efficiency of system operation attainable with the subject invention, which uses a new blocking symbol technique. The problem is that multi-processor shared data cannot be accessed and modified in parallel. A group of accesses by one processor must be executed one at a time but as a logical or atomic unit as seen by other processors in order to preserve the integrity of the data in the shared computer resource. It is said that the accesses by the processor must be serialized with respect to accesses by other processors.

The invention deals with preserving the integrity of multi-processor shared data contained in data structures in a computer system. These shared data structures are herein referred to as "resources" of the computer system, which for example include data files, queues of any type, buffers for temporarily holding data, changeable programs, etc.; in other words, any computer data structure which may be changed by parallel processes.

Serialization in accessing a resource by multiple processes (programs being executed by multiple processors) means that only one process at a time is allowed to access the resource. Accessing includes both processor fetching and storing to addressed locations in the main storage of a computer system. Programs may perform multiple accesses to a single data structure, and these accesses must be serialized as a single unit of operation if the same program, or other programs, executing on other processors of the system are always to see a consistent view of the resource.

An example of serialization is: if process 1 stores the values A and B at locations X and Y, respectively, and process 2 stores the values C and D at locations X and Y, respectively, it may be imperative that the final contents of X and Y are either A and B or C and D but not A and D or C and B.

A second example is: If locations X and Y contain A and B, respectively, and process 1 stores C and D at X and Y, respectively, and process 2 fetches from locations X and Y, it may be imperative that process 2 fetches either A and B or C and D but not A and D or C and B.

A third example is: if processes 1 and 2 fetch from location Z and, because the fetched values are a predetermined value P, process 1 stores Q at location Z and process 2 stores R at location Z, process 1 may conclude that location Z contains Q while process 2 concludes that Z contains R.

The third example is addressed by U.S. Pat. No. 3,886,525 to Brown et. al., assigned to the same assignee as the present invention. U.S. Pat. No. 3,886,525 discloses a Compare and Swap (CS) instruction. CS has a first operand and a third operand in registers and a second operand in storage at a specified address. CS compares the first operand to the second operand and, if they are equal, stores the third operand at the second-operand location and indicates this result by a condition code 0. If the first and second operands are not equal, CS loads the second operand into the first-operand register and indicates this different result by a condition code 1. CS has the novel feature that, between the time when the second operand is fetched and the time when CS completes by setting condition code 0 or 1, no other instruction, executed by another processor, is allowed to store at or fetch from the second-operand location, this effect being achieved by the locking by CS, in the cache of its processor, the line containing the second-operand location. This novel feature of CS is called an interlocked-update reference.

In the third example, if both processes fetch and store to location Z by means of CS, then only one of the processes will fetch the value P, and only that process will store at location Z.

The CS instruction is not applicable to the first and second examples since X and Y in those examples are two different storage locations which most probably are in different cache lines. Processors cannot each lock two cache lines since this may lead to deadlock. For example, if processor 1 has locked a line containing X and is attempting to lock a line containing Y, processor 2 may have locked a line containing Y and be attempting to lock a line containing X. Now neither processor can proceed.

The first and second examples have been addressed in practice by a programmed lock. A simple programmed lock can be implemented by means of the CS instruction as described for the third example. In that example, the second-operand location can represent a lock, and the predetermined value P can have the meaning that the lock is not currently held. If either process 1 or 2, using CS, replaces P with the third-operand value for the process (Q for 1 or R for 2), then that process has obtained the lock and is allowed, by programming convention, to access the locations X and Y of the first or second example. The other process, by programming convention, is not allowed to access X and Y until it obtains the lock. It cannot obtain the lock until the first process (which may be 1 or 2) has replaced the contents of Z with P.

Now, the problem arises in practice of what a process is to do while it is waiting for the lock represented by location Z. A solution which is practicable in certain cases is for the process to treat the lock as a "spin lock", that is, the process repeatedly executes a CS instruction (spins on the lock) until it obtains the lock. This solution wastes the time of the processor that is executing the process and is only practicable if it can be assured that the lock will not be held for more than a brief time. In the general case, the lock can be held for a very long time because the process holding it may, for example, encounter a page fault when accessing the location X or Y of the first or second example. This will cause the process to be interrupted in order for the control program to resolve the page fault. Since it may take a long time to do that, the control program may undispatch the process and dispatch another process in its place. The control program may even swap out the address space containing the process. Thus, a spin lock is only practicable in practice when it is known there cannot be a page fault and when the processor is disabled for other asynchronous interruptions such as an I/O interruption.

In the general case, the solution to the problem of what to do when a lock is held is to use control program services. For example, a lock can be represented by an event control block (ECB), a process that finds the lock is held can invoke a Wait service specifying the ECB, which will cause the process to be undispatched, and the process holding the lock can release the lock by invoking a Post service specifying the same ECB, which will cause the first process to be placed on a queue of processes eligible to be redispatched. The use of these services can be very time consuming, and it is highly desired that some hardware-assisted method, beyond the simple CS instruction, be available to provide locking in order to serialize the use of resources.

U.S. Pat. No. 5,081,572 to Arnold, assigned to the same assignee as the present invention, discloses Compare and Swap Disjoint (CSD) and Compare and Load (CL) instructions for use as in the first and second examples above. CSD and CL are said to perform interlocked-update references to two locations. In practice, the way of implementing Arnold's interlocked-update references is to quiesce all processors except the one executing the CSD or CL instruction. This is very wasteful of the time of the quiesced processors and is inefficient.

Another way of replacing a programmed lock is a classification of a subset of computer instructions into a locking class for controlling access to a general type of resource to be protected by use of the instructions in that class. This is disclosed in U.S. Pat. No. 5,333,297 to Lemaire et al (owned by the same assignee as the subject application), and in later filed U.S. Pat. No. 5,488,729 to Vegesna et al. Neither of these patents discloses blocking symbols, which are an essential component of the subject invention. The Lemaire et al patent classifies subsets of computer instructions into locking "classes", each identified by a particular operation code and dedicated to a general type of resource in a computer system, with the type indicated by their instruction operation code. The Vegesna et al patent classifies instructions according to the execution unit which is to execute the instruction, and is a different type of instruction classification than in the Lemaire et al patent. In Lemaire, each instruction class (determined by the operation code) is designed to atomically make data changes in a general type of resource, associated with that instruction class, such as double-threaded queues. A severe restriction on use of the Lemaire instruction-classification invention is that it prevents any other instruction in a locking class from executing on currently unused resources when any instruction is executing in the same locking class on any other processor of the CEC (Central Electronic Complex), comprised of multiple processors. Such locks are provided in each processor's hardware-microcode and not in a centralized hardware-microcode storage area separate from each processor. The lock on a resource is duplicated in each processor's hardware, and inter-processor communications are required to coordinate the state of the lock between these multiple copies of each lock.

The subject invention does not use either interlocked-update references or classes of instructions for controlling its locking, and this invention does not suffer from their deficiencies. The resource serialization done by the subject invention does not have the Lemaire restriction of allowing only one of multiple processor's executing Lemaire's instruction classes to access one resource at a time. On the other hand, the subject invention allows multiple processors to simultaneously access plural resources in parallel as long as each of the processors is accessing a different resource using a different lock and a different blocking symbol. The subject invention discovers the use of blocking symbols (not found in any prior art) for identifying resources and controlling their access serialization. The subject invention uses blocking symbols in a new type of instruction to allow the users of a system (e.g. its programmers and programs) to have more precise access control, more resource accessing parallelism, and more resource access granularity than the techniques taught by any known prior art.

The lock classification of instructions (as done in Lemaire et al) binds the association of instruction class to resource type at the time a computer architecture is designed to use such instruction classes. The architectural decisions must be made before a computer design is released for manufacturing a computer. Thus computers built with Lemaire's lock classified instructions may not later be architecturally changed, which may prohibit a software associations of locks with later installed resources in a computer system. In most computer installations, new programs are always being developed and many old programs changed, so resources to be serialized will be defined, or changed, over time from program to program. The invention in the subject application enables late software binding of locks to resources of any granularity, usable for controlling the serialized accessing of newly added resources. The locks are chosen and specified to the machine dynamically by the programs, for example. The machine enforces the serialization of operations on the resources represented by the program-specified blocking symbols.

Also, this invention does not require inter-CPU communication broadcasts on inter-CPU buses between CPUs on each processor instruction execution initiation to signal to each other processor as is done in Lemaire et al.

SUMMARY OF THE INVENTION

This invention provides a new method of implementing blocking symbols in a multi-processor CEC for controlling the locking and sequencing of simultaneous PLO instruction instances using the same blocking symbol, which indicates multiple processors are conflicting with each other in trying to access the same resource at the same time. The well-known solution (implemented in a new way by this invention) is to serialize the different processor accesses to the resource to maintain the data integrity of the resource.

This invention associates a processor's CLE (CPU lock element) with each of the processors in a CEC in a protected storage. Each CLE contains a PLT (program lock token) field in which a blocking symbol is recorded for any PLO instruction instance currently executing in the associated processor. Each CLE also has a blocking symbol lock field H, which indicates the lock-held state (or the not held state) for the processor in regard to the resource indicated in the PLT field, and the held state indicates the associated processor has exclusive rights to access the resource unit associated with the blocking symbol during, and only during, execution of a PLO instruction instance by the processor associated with that CLE.

Thus, the method of this invention assigns each processor a blocking symbol lock by assigning each processor in the CEC (capable of executing PLO instances) a respective CLE containing the processor's lock in the H field of that CLE. The execution by each processor of a PLO instruction instance is controlled by the respective processor's H lock for all of PLO blocking symbols used by that processor. When the processor's H field is set to the held state, the processor has locked the resource associated with the blocking symbol in the sense that this is the only processor in the CEC which can then access the associated resource during the current PLO instruction instance being executed by that processor.

Each PLO instruction instance being executed by a processor specifies: a blocking symbol (representing an associated resource unit), locations to be accessed in the resource by the processor, and a function code which determines the PLO process performed by the processor during that instruction instance.

When the resource is available to the processor, the method of this invention locks the resource for the requesting processor's PLO instruction instance, during which the processor is allowed to immediately and exclusively use the resource. An instruction instance may include multiple accesses to non-contiguous locations in storage. If the blocking symbol (associated with the resource unit) is not available to the processor at the time the processor requests the resource, this invention then controls the sequencing of the requesting processor in relation to one or more other (conflicting) processor(s) simultaneously using, or waiting for use of, the same blocking symbol. Hence, the operation of this invention affects how long a PLO requesting processor may wait for the resource to become available to it.

Accordingly, a PLO instruction instance is a conflicting PLO instruction instance (i.e. a conflicting PLO request) if another processor is currently holding a lock on the same resource, and one or more other processors may also be simultaneously requesting the same blocking symbol. All such requesting processor(s) will then wait for the resource to become available and will receive access to the resource in the order in which they requested it.

Each processor making a PLO request for a resource unit will get to exclusively access the resource during its execution of its PLO instruction instance whether it immediately gets access to the resource or has to wait to get the access. The processor will get exclusive access to the resource unit associated with its blocking symbol for exactly one PLO execution instance, and the processor will automatically give up its access rights to the resource at the end of execution of the PLO instruction instance, and the resource then becomes available for accessing by another PLO instruction instance.

This invention automatically serializes the execution of simultaneously executing PLO instruction instances specifying the same blocking symbol (herein also called conflicting PLO requests) by sequencing them in the order the PLO requests are received by a CLE area of CEC storage.

The sequencing of each PLO instruction instance is determined shortly after initiation of the PLO instruction instance by a processor, at which time the processor accesses a CLE area of CEC storage (in a protected storage area) and makes an atomic search of all other CLEs in the CEC to determine if any other CLE currently holds the lock on the blocking symbol used in the processor's currently executing PLO instruction instance. An atomic search is one in which only one processor may be examining the CLEs at a time. The examination of the CLEs is made atomic by a scan lock, which must be obtained by a processor before beginning any processing of the CLEs. The scan lock is in the system protected storage area with the CLEs.

In more detail, at the time any processor initiates a PLO instruction instance, a PLT value is obtained from the executing PLO instruction instance, and that PLT value is written into a PLT field in the executing processor's CLE in the protected storage area. Then, the executing processor makes an atomic search of all other processor CLEs to determine whether any other processor has a PLO conflict with the requesting processor's current PLO instance. During the search, the requesting processor may find one of the following states:

1) no lock on the requesting blocking symbol is held by any processor, and therefore there is no conflicting CLE, in which case the requesting processor gets the lock immediately by setting its H field in its CLE, and the processor can immediately perform and complete the process defined in its function code. The processor then executes the function indicated in its PLO instruction instance to complete the instruction instance.

2) A lock on the requesting blocking symbol is found to be held by another processor, and the CLE of that other processor indicates no other processor is waiting for that blocking symbol. Then, the requesting processor writes into a wait field in that other processor's CLE a pointer to the requesting processor's CLE. The requesting processor then sets the wait field in its CLE to indicate it is the last processor that is waiting for the blocking symbol, and the search is ended. As soon as the processor currently holding the lock completes its PLO instruction instance, the requesting processor will be the next processor to get the lock on the requested blocking symbol, and therefore will be the next processor to be able to complete the execution of its PLO instruction instance.

3) In the process of releasing a lock, a processor examines the wait field in its own CLE to find out whether or not another processor is waiting for control of the PLT it is releasing. If the wait field is non-zero, it contains the address of the CLE of the next waiting processor. The releasing processor grants the next waiting processor control of the PLT by setting to the held state the lock in the waiting processor's CLE, using the address in its own CLE wait field to address it. The processor then clears the wait field in its own CLE.

4) A lock on the requesting blocking symbol is found to be held by another processor, and the CLE of that other processor indicates another processor is waiting for that blocking symbol by its wait field containing a pointer to another CLE representing another processor waiting for the blocking symbol, which thereby indicates that one or more other processors are waiting for the blocking symbol of the requesting processor. The requesting processor continues the search by going to the pointed-to CLE to find if it is the last CLE in a chain of CLEs for the requested blocking symbol. The pointed-to CLE will indicate if it is the last in the chain or not. If it indicates it is not the last CLE in the chain, the requesting processor continues the search by going to the CLE pointed-to in the last examined CLE, until the requesting processor finds a CLE of another processor which is the last CLE in the chain. Then, the requesting processor writes into the wait field in that last processor's CLE a pointer to the requesting processor's CLE, which makes the requesting processor's CLE the new last CLE in the chain for the requested blocking symbol. The requesting processor has a waiting field of zero to indicate that it is the last processor currently waiting for the blocking symbol, and the search is ended. The requesting processor will have to wait for all processors having CLEs in the chain prior to it to complete their PLO instruction instances before the requesting processor will get to complete its PLO instruction instance. This wait may involve execution of up to N–1 prior PLO instruction instances where the CEC has N number of processors capable of executing PLO instructions.

The CLE wait field for each processor has an associated control indication of "last/non-last CLE in a chain", when the PLT field in the CLE contains a blocking symbol. This "last/non-last CLE in a chain" indication may be provided in any of several different ways, such as: the zero value/non-zero value in the wait field, or by a special flag bit used in conjunction with the CLE wait field. The zero value in the wait field (or the alternative "last" state for the flag bit) indicates the "last" state for the CLE, which means the CLE is the last CLE in a chain when the CLE contains a blocking symbol and the H field indicates the not-held state. Then, the non-zero value in the wait field (or the alternative "not-last" state for the flag bit) indicates the wait field contains a pointer to another CLE in the chain for the blocking symbol in the CLE's PLT field. In the preferred embodiment herein, the zero/non-zero values in the wait field of each CLE are used to indicate its last/not-last wait field state in conjunction with the H bit state for the blocking symbol in the PLT field of the CLE. If the CLE contains a PLT but the H field indicates the available state, the CLE is waiting to receive control of the PLT.

Each chain of CLEs for a blocking symbol effectively represents a processor queue for indicating all processors currently waiting for the respective blocking symbol (which represents a resource unit to which access is serially required by each of the processors represented by the CLE(s) in the queue). Each queue (chain) is headed by the CLE of the processor currently holding the lock on the resource of the chain. When any CLE enters the chain, it is threaded into the queue as its last waiting CLE (at the opposite end of the chain from the CLE currently holding the lock).

Whenever the processor heading any chain completes its PLO instance, its CLE has its H field set to the not-held state, its PLT field is set to a zero state to indicate the CLE has no valid blocking symbol, and its wait field W is set to the "last" state (not pointing to any other CLE). This is done, for example, by setting the W field content to zero (or alternatively setting any wait flag bit to "last" state), which prepares the CLE for when it again receives its next blocking symbol from its associated processor when a new CLE search is need to determine if the CLE will then be in a chain or not.

Thus at any time, the CLEs of the CEC may not be chained (not be formed into any queue). Or the CLEs of the CEC may be chained into one queue. Or the CLEs of the CEC may be chained into plural queues simultaneously existing, one for each unique PLT in an ongoing PLO instruction; and every CLE in each chain is currently waiting for the same resource.

Each PLO requesting processor initiates a CLE search and may find another processor's CLE is currently holding the specified blocking symbol, and may trace a chain of one or more other CLEs for that blocking symbol, until if finds the last CLE in the chain and writes into the wait field W of that last found CLE a pointer to the CLE of the search-initiating processor. In this manner, the search-initiating CLE becomes the last CLE in the chain for the blocking symbol. Thus, each searching processor will add itself as a waiter in a CLE chain for the requested blocking symbol.

Each processor waiting in a chain is granted use of the requested blocking symbol by its predecessor processor in the chain. That is, when the processor currently holding the lock on a blocking symbol completes its PLO instruction instance and finds a pointed-to CLE in its wait field, that processor becomes a predecessor processor by accessing the pointed-to CLE in its wait field, and sets the H field of the pointed-to CLE to the held state (i.e. locked state). The setting of the H field gives exclusive control of the blocking symbol to the processor associated with the pointed-to CLE, and the latter processor is the next processor to be able to complete its PLO instruction instance using the resource associated with the chain's blocking symbol. A processor in the waiting queue must test the H field in its own CLE to discover its granting of PLT control by its predecessor processor.

In the preferred embodiment, all CLE's are located in the main storage of the CEC, in an area protected for use only by the processor hardware-microcode (H-M). This area is not accessible to (i.e. not addressable by) programs executing on the CEC. All CLE's are accessible by execution processes in all processors of the CEC and may be accessed during execution of a PLO instruction on any processor of the CEC.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

DESCRIPTION OF THE DETAILED EMBODIMENT

Figure 1:
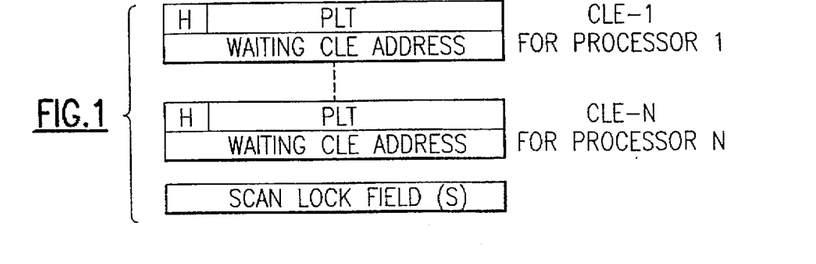
FIG. 1 represents a set of CLEs and a scan lock field in protected storage at locations known to the processors in a CEC having the capability of using PLO instructions.
Figure 5:
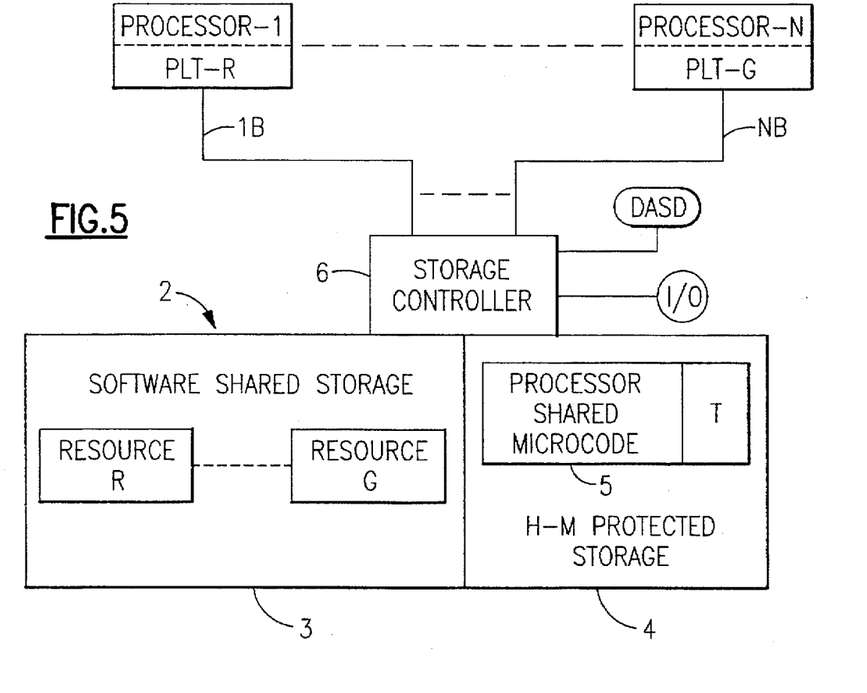
FIG. 5 represents a CEC using the subject invention.

The FIGUREs illustrate the preferred embodiment in this specification. FIG. 1 represents all CLEs (processor lock entries) in a CEC, of which each CLE is assigned to a different one of processors 1–N in the CEC (central electronic complex) capable of executing PLO instruction instances, which are shown in FIG. 5. That is, the CEC has N number of processors capable of executing PLO instructions, of which CLE-1 is assigned to processor 1, and so on, through CLE-N which is assigned to processor N. A Scan Lock field S is also provided for use by all processors when any of them are executing a PLO instruction instance.

The locations of each of these CLEs and of scan lock S may be anywhere in a storage of the CEC, and the only requirement is that their locations be accessible to all processors 1–N, because each processor has a need to access all CLEs as well as the CLE associated with the processor. Scan Lock field S is used by each of the processors 1–N when it is initiating a PLO instruction instance to allow only one processor at a time to access all of the CLEs.

Although Scan Lock field S and all of CLEs 1–N may be located in any CEC storage accessible to all processors 1–N, they are preferably located in a protected area of shared storage in the CEC accessible only to processor hardware-microcode (H-M) operations. That is, these locations are preferably not addressible by software instructions, since software accessing of the CLEs is not needed, and software could inadvertently damage the operation of the CLEs and thereby damage the integrity of data in the CEC. Hence, the proper operation of the CLEs is considered critical to the proper operation of the CEC.

FIG. 5 shows a CEC utilizing the subject invention. This CEC has a main storage 2 having a section 3 accessible to software executing on the system, and a section 4 which is not accessible to software but is accessible to processor hardware-microcode for controlling the hardware operations of the processors. The protected storage 4 contains a processor shared microcode 5 and a table T which contains the CLEs 1–N and Scan Lock S shown in FIG. 1. The software shared storage 3 contains software resources R . . . G which contain data shared in the system, and to which blocking symbols are assigned for use in this embodiment. The CEC is conventional except for the CLE and S elements shown in FIG. 1 and the processes shown in FIGS. 2, 3 and 4 (or alternative processes using the teachings of this invention). Thus, the processors 1–N are conventional (assumed to be S/390 processors in this embodiment), except for the addition of processes according to the teachings of this invention. The execution of PLO instructions by such processors using the teaching provided herein is novel to this application, which includes the providing of blocking symbols (BLS-R through BLS-G) by processors 1–N to storage controller 6 for use with the CLEs in the protected shared microcode 5 operating with the processors according to the processes described in FIGS. 2, 3 and 4. The storage controller 6 may be conventional, connecting the system main storage 2 to DASD (direct access devices) and to I/O, as well as to processors 1–N through buses 1B through NB.

Each CLE in FIG. 1 has: a PLT field, an H field, and a wait field W. The PLT field is for containing a blocking symbol. The PLT field contains a value which is either zero (indicating no blocking symbol exists in the PLT field), or non-zero (representing a blocking symbol in the PLT field). The H field is a lock field: when H is set to a held state it indicates the processor associated with the CLE is holding a lock on the resource represented by the blocking symbol in the PLT field.

In other words, the "held" state means the associated processor then has the exclusive right to access the resource represented by the blocking symbol in the associated PLT field (and no other processor in the CEC can then access the associated resource). Thus, the lock-holding processor is the only processor in the CEC which is allowed to access the associated resource for the remainder of the PLO instruction instance currently being executed by the CLE associated processor. When the H field is set to the "non-held" state, it indicates that its associated CPU does not currently have exclusive rights to the associated resource.

When a particular CLE has a zero value in its wait field W while its H field indicates a non-held state, these states indicate the associated CPU is waiting for the resource represented by the associated PLT value, and that this particular CLE is the last CLE in a chain of two or more CLEs needing the same resource (indicated by the same blocking symbol being in all CLEs in the chain). And when the particular CLE has a zero value in its wait field W while its H field indicates the held state, these states indicate the associated CPU is executing its PLO instruction instance and no other processor is waiting for the resource represented by the associated PLT value.

Resource sequencing is indicated when a particular CLE has a non-zero value in its W field. The non-zero value indicates that the exclusive access rights to the resource (associated with its PLT value) will pass to a processor associated with the CLE pointed-to in the wait field of the particular CLE, when the CLE's associated processor completes execution of its PLO instance (whether its H field indicates the particular CLE is currently processing or waiting). Thus, the non-zero wait field value indicates the particular CLE is in a chain of two or more CLEs. The wait field of the pointed-to CLE may, in turn, point to another CLE associated with another processor which will later get the exclusive access rights to the resource unit (when its H field gets set to the held state), or its wait field may contain a zero state indicating its associated processor is at the end of the current chain needing the resource unit defined by the blocking symbol in the PLT fields of the CLEs in the chain.

Any number of CLEs (up to the maximum number of CPUs in the CEC) may be chained together by their wait fields to represent up to all CPUs in the CEC waiting for the same resource. At any time, the CLEs may be connected through their wait fields into no chain, into one chain, or into a plurality of chains. At any time, the waiting CLEs will each have its H field set to the non-held state, and the CLE having its H field indicating the held state will have its associated processor enabled for executing its current PLO instruction instance.

At any time during the operation of the CEC, any number of the processors may be simultaneously executing PLO instruction instances as long as they are all specifying different blocking symbols (by having different PLT values). Serialization of execution of PLO instruction instances is required only when two or more CLEs are simultaneously specifying the same blocking symbol (same PLT value), in which case they need to be chained together to control their serialized execution.

Thus, when different CLEs contain different blocking symbols, they have no conflict since their associated processors are using different resources. These processors can execute in parallel and can access and modify their different resource units (indicated by different blocking symbols in their CLE entries). No serialization is required for accesses to different resource units. For example, the resource unit associated with a blocking symbol may be one or more software or hardware entities of the CEC.

Hence, a PLO instruction instance may be initiated by any processor at any time, which leaves open the possibility of two or more processors in the CEC concurrently initiating PLO instances having the same blocking symbol. The CLEs of such simultaneous initiating processors need to be chained together in the manner taught by this invention. An issue then arises as to which processor shall be allowed to do the chaining of the multiple CLEs affected by this possibility. It is clear that more than one processor cannot be allowed to simultaneously chain the CLEs, since uncoordinated CLE chaining operations may result in improper chaining and failed CLE operations. This embodiment provides an internal CEC protocol for coordinating any number of processors concurrently initiating conflicting PLO instances. This protocol uses the Scan Lock field S to serialize concurrently initiating PLO instances, so that only one of the initiating processors is allowed to access the CLEs at any one time for determining if any chaining is needed, and for performing any needed chaining of the CLEs.

In this embodiment, CLE chaining is controlled through lock S without regard to whether the concurrent blocking symbol values are the same or different. The CLE chaining operation is solved herein by atomically allowing only one processor at a time to access and set field S, and the S setting processor is the only processor allowed to determine if its own CLE can have immediate control of the PLT, or if its own CLE needs to be chained. The protocol enables the processor atomically getting the S lock to search all CLEs to determine if its own CLE needs to be chained, and if so performs a write operation of inserting a pointer to itself into the wait field of the CLE it has determined by the search to proceed it in the chain.

Accordingly, the possibility of multiple processor CLE competition for the same blocking symbol requires atomic testing and setting of the CLE search function, to determine which processor must search all of the CLEs to determine if any other CLE is holding the CLE lock on the blocking symbol. This atomic searching is implemented by using the scan lock field S in the protected storage. Any processor getting the CLE scan lock is the only processor which can make the next CLE search, and at any time any number of processors may contend for the scan lock.

It is to be noted that the atomic operation for getting scan lock field S only determines which processor will next perform a CLE search and perhaps a CLE chaining operation. The atomic operation for getting lock S does not determine which processor will next get exclusive access to the requested resource, which is determined by any CLE chaining performed after the S lock is obtained. The CLE search/chaining atomic operation distinguishes the invention in this specification from the hashing-controlled invention in related patent application Ser. No. 08/864,402 in which an atomic operation on a hash lock determines which processor next gets exclusive access to the resource. The atomic operation of this invention determines which processor will perform any CLE chaining needed by conflicting PLO requests for the same resource, which is not done in the embodiments of related patent application Ser. No. 08/864,402.

If the atomic CLE search does not find any other CLE containing the searched-for blocking symbol, then there is no competing processor, and the requesting processor is not required to wait for exclusive access to the resource unit associated with the current blocking symbol being written into its CLE, and it writes its blocking symbol into its CLE PLT field and sets its H field to the held state, so it can then immediately access its required resource and perform the remainder of its PLO instance.

If the atomic search finds one or more other CLEs containing the requesting processor's blocking symbol, then the processors associated with those CLEs are competing processors, and the CLE of the requesting processor is chained to the CLE of the last processor to have requested the same blocking symbol. In this embodiment, the last CLE in a processor wait chain is indicated by: finding a CLE having the same PLT value and having its wait field in a zero state. Any CLE indicating its wait field contains a non-zero entry has its wait field accessed to obtain a pointer to a next CLE in a chain, and the next CLE at that pointed-to location is accessed and its wait field scanned to continue the search until the last CLE in the chain is found, to which the CLE of the searching processor may be chained.

CLE conflicts must be handled in any computer system or the integrity of shared data will suffer in the CEC, even though CLE conflicts may rarely happen. While the first processor of conflicting instances is given access to a resource, the other instances are extending their execution time to include the execution time for the prior conflicting CLE(s). Alternatively, a waiting processor may terminate an incomplete waiting PLO instance, and later perform it when its program re-executes the PLO instruction. Because conflicting PLOs instance may rarely happen, they should not have much effect on the average execution time for the PLO instruction instances, which should be very short in duration.

This invention may have its blocking symbols implemented in various ways, and the set of blocking symbols assigned to the CEC resources are used by all CEC programs and are shared by all CPU's of the CEC executing the programs. In a multi-computer image environment, such as an LPAR CEC (Logically Partitioned CEC), each partition may have a set of locks that are shared by all CPUs but are restricted in their use to a respective partition when using PLO instructions performed for software programs executing in that partition). Alternatively, in an LPAR multi-computer image environment, a set of blocking symbols may be shared by all partitions executing software programs such as by using the host real addresses of the storage resources as their blocking symbols which addresses are unique across logical partitions.

Figure 2:
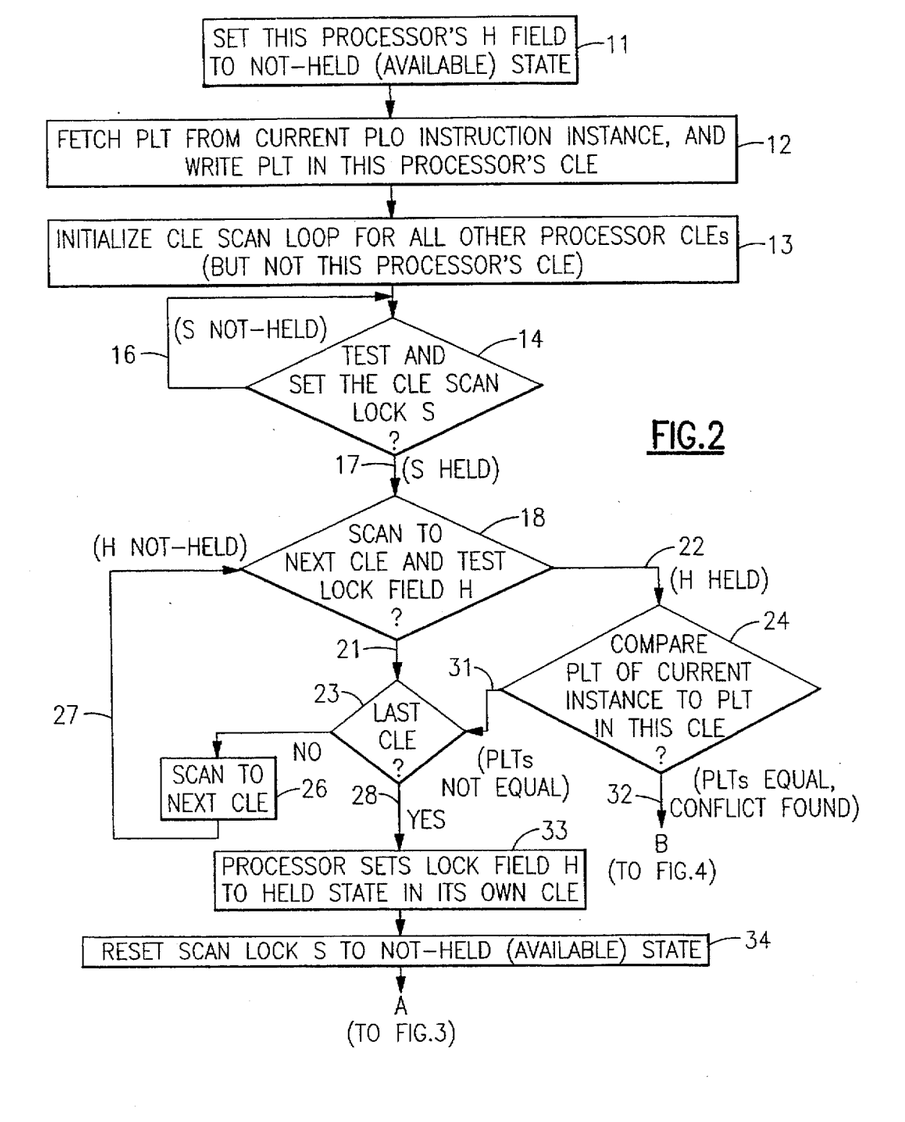
FIGS. 2, 3 and 4 represent detailed flow diagrams of a method provided by this invention in which multiple processors use CLEs containing blocking symbols in a computer system.

FIG. 2 is a flow diagram of a process which may be used by any of processors 1–N for executing a PLO instruction instance according to the teachings for a preferred embodiment of this invention. This embodiment is but one embodiment which may be provided according to the teachings of this invention.

Figure 6:
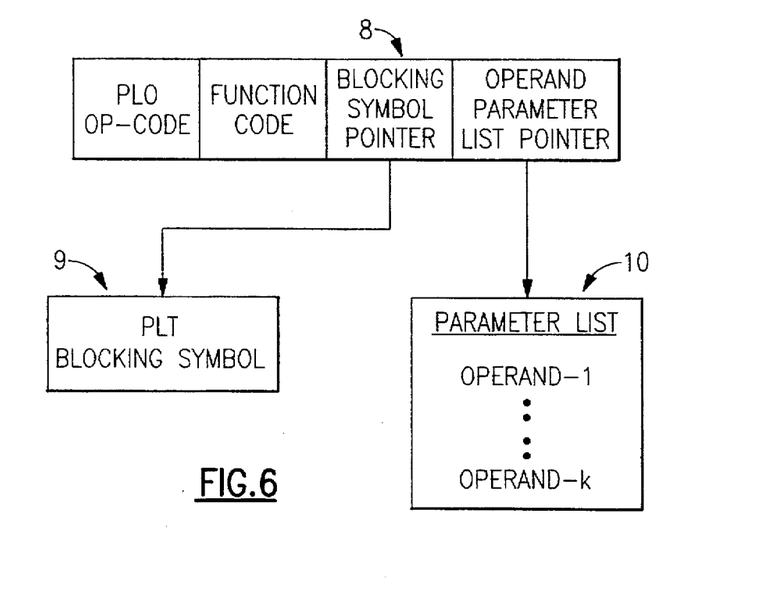
FIG. 6 represents a PLO instruction of the type which may be executed in a PLO instruction instance by the preferred embodiment of this invention.

The process in FIG. 2 begins after the initiation of execution by any of processors 1–N of a PLO instruction of the type shown in FIG. 6. The PLO instruction format shown in FIG. 6 contains a PLO op-code which is initially detected during any PLO instruction instance. (An instruction instance is a single execution of any instruction. Any instruction may be executed many times for providing many instruction instances.) Upon processor initiation, the op-code is first detected as indicating a PLO instruction operation, and its Blocking Symbol Pointer field is read which provides a pointer address for locating a PLT Blocking Symbol 9 in the software storage 3 (or alternatively in a general register, not shown). This PLT value is obtained from 9 and the PLT value and the identifier of the executing processor (PID) are sent on one of the connecting buses 1B–NB to storage controller 6 in FIG. 5 with the processor identifier for enabling the processor microcode to locate all of the CLEs in FIG. 1 including the CLE assigned to the PLO executing processor.

Other operands in instruction 6 are not yet used in its execution and will be used after the requesting processor obtains exclusive accessing rights to the resource which requires the requesting processor to have the H field in its CLE set to the held state. After the requesting processor holds its H lock on the resource, it will continue execution of its PLO instance by performing all operations indicated by a Function Code in its current PLO instruction instance. These FC operations will access and use the operand addresses specified in a parameter list 10 in FIG. 6 pointed to by a field in the requested PLO instruction instance 8.

In step 11, the processor of each PLO request accesses its CLE, and sets its H field (assumed to be a single bit in the preferred embodiment) to the not-held state. Then in step 12 the requesting processor fetches the PLT value from its PLO instruction in program storage 3 and writes the PLT value into the PLT field of its CLE in protected storage 4.

In next step 13, the processor initializes a loop scanning routine which it wants to use to scan and examine the other CLE's associated with all other processors of the system to determine if any other processor has a concurrent conflict with the requesting processor. But before the processor can use the loop scanning routine it must know it will not have interference from any other processor attempting to simultaneously execute another loop scanning routine which would operate independently of the requesting processor to unpredictably affect chaining among the CLEs. The Scan Lock field S is used to coordinate the use of the loop scanning routines, whereby a protocol is used in which no processor is allowed to use the loop scanning routine until it is holding the Scan Lock S.

In the next step 14, the requesting processor attempts to get the Scan Lock S by doing a test and set operation on the Scan Lock field S. When it is holding the Scan Lock S, it is assured that it is the only processor scanning the CLE's since only one processor can atomically access and set the scan lock field S at a time. If lock S is not obtained on its first attempt, the requesting processor will continue to do Test-and-Set operations on lock S until scan lock S is set by the requesting processor for obtaining the hold state for lock S. While holding the scan lock S, the requesting processor executes its Scan Loop to test the state of the H field in each next other CLE not yet examined of the other processors in step 18. If that CLE is in the not-held state, path 21 is taken to check if the CLE is the last of the other processor CLEs not yet examined. If step 23 finds it is not the last CLE to be examined, the processor scans in step 26 to the next CLE's not yet examined and loops back to step 18 to examine the H field of the next CLE. If, at step 18, the CLE examined is found to be in the held state, then step 24 compares the PLT held by that CLE with the PLT of the currently requesting PLO instance. If they do not compare equal, path 31 is taken to step 23 to test if it is the last other CLE to be scanned and examined. If it is not the last CLE, the path to step 26 is taken to go on to the next CLE at step 26 and examine it by looping back to step 18, and so on until another CLE having an equal PLT is found or until the last other CLE is scanned and examined, in which case no other CLE has a hold state on the resource associated with the PLT blocking symbol and a path is taken to step 33 to set the H field to the held state in the requesting processor's CLE, so that the requesting processor can immediately continue processing its PLO instruction instance. Then the requesting processor goes to step 34 and resets Scan Lock field S to the not-held (available) state, so that the S field is again made available to other processors which can then scan the CLEs for executing another PLO instance. Processor control then is passed to entry point A in FIG. 3 to complete the execution of the requesting processor's current PLO instruction instance.

Figure 4:
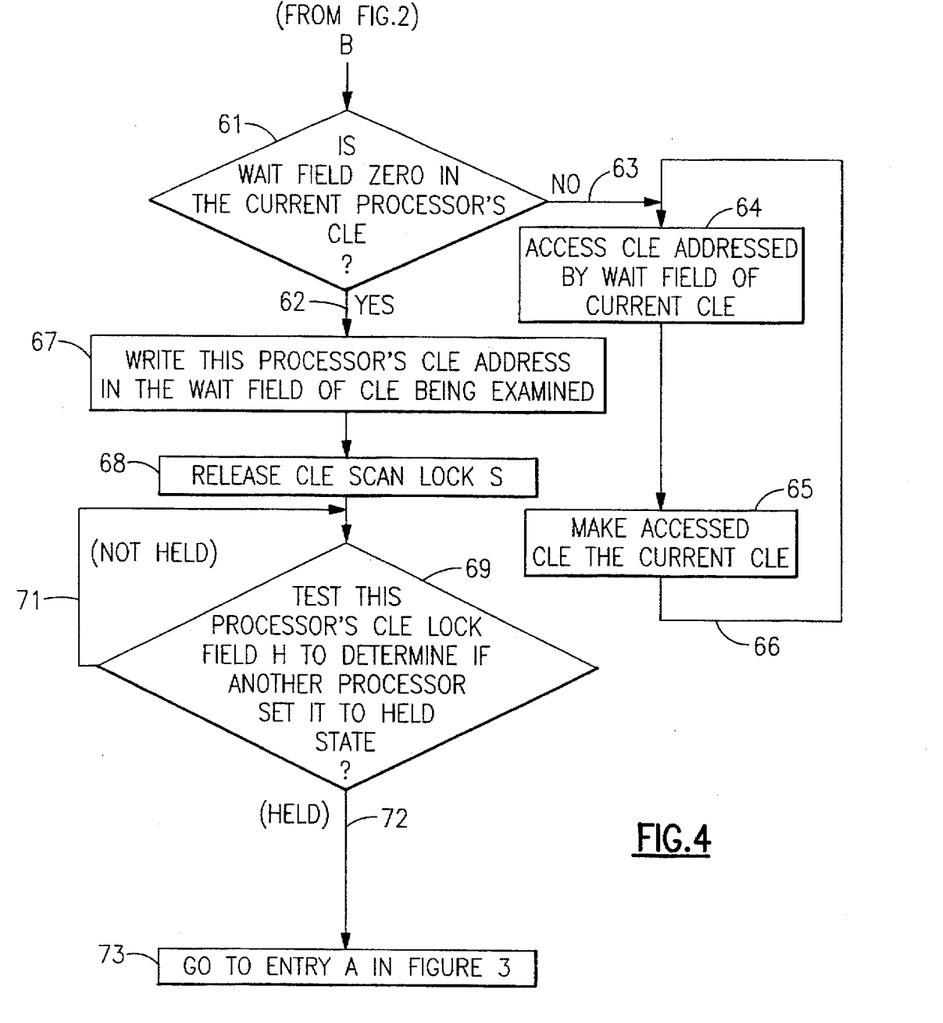

If step 24 finds a PLT equal condition between the requesting processor's PLT and the PLT in another CLE, a conflict is found with the another simultaneously-executing PLO instruction instance, and the method in FIG. 2 goes to entry point B in FIG. 4 to chain the requesting processor's PLO instance as the last entry in a chain for using the PLT, which will delay the completion of execution of the requesting PLO instance until after all other PLO instances in that PLT chain have completed their execution.

Figure 3:
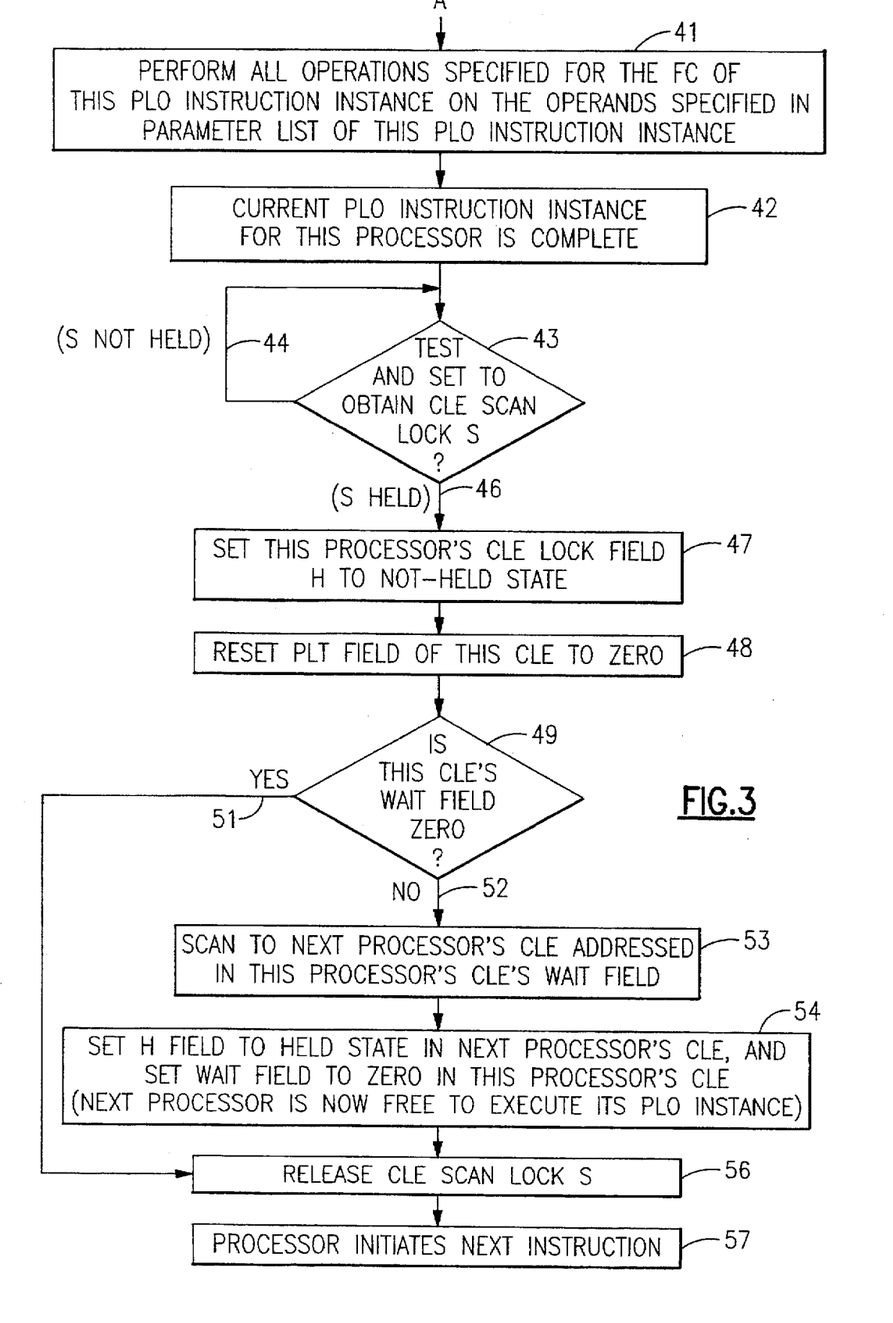

When entry point A is entered in FIG. 3, step 41 performs all operations specified for the function code (FC) of the requested PLO instance on the operands specified in the PLO parameter list 10 pointed-to by a parameter list address in the PLO instruction shown in FIG. 6.

When the FC operations have been performed, step 42 recognizes that the execution of the requested PLO instance is now complete, but before the requesting processor is done it must do some final CLE housekeeping steps, such as to set the requesting processor's CLE to a non-held state and to change any chain existing for the used blocking symbol by removing the requesting processor's CLE therefrom. However, before the CLEs can be changed by the requesting processor, it must get hold of the Scan Lock S.

Step 43 performs an atomic test and set operation to gain control of the CLE scan-control lock, which may involve some spinning in loop 44 if the S lock is not immediately available. When the requesting processor holds Scan Lock S, it does step 47 by setting the H field in its CLE to the not-held state, and does step 48 to set its PLT field to zero. At step 49, the requesting processor tests its CLE's Waiting-CLE field for a zero or non-zero content. If its wait field is zero, this CLE is the last in the chain, and path 51 is taken to step 56 which releases the Scan Lock S to make it available to other processors.

If this CLE's wait field is not zero, it is pointing to another processor's CLE which is waiting for transfer of control of the PLT by the requesting processor to it. Then path 52 is taken to step 53 which scans to the CLE addressed in the wait field in its CLE, and the addressed CLE is associated with the next processor to control the same PLT. Then the requesting processor in step 54 sets the H field to the held state in the next CLE in the chain. In this manner the next processor in the chain becomes the holder of exclusive rights to access the resource unit represented by the same PLT blocking symbol, and in this manner the requesting processor transfers the exclusive control of the resource unit to the next CLE in the PLT chain. This action by the requesting processor enables the next processor to end its waiting loop 71 in FIG. 4, so that the next processor can then take path 72 which takes it to step 41 in FIG. 2 where it continues the processing of its PLO instruction instance.

After the requesting processor completes step 54, it enters step 56 to release the CLE Scan Lock S to allow access to the CLEs by the other processors, and at step 57 the requesting processor initiates the next instruction in its instruction stream.

The described method guarantees that control of a specific PLT will be serially granted in the order in which requests for it are made, where multiple requests are made for it while it is already held by a processor.

If a conflicting CLE is detected by step 24 in FIG. 2, path 32 is taken to entry point B in FIG. 4 for chaining the current request into a sequencing queue for the PLT blocking symbol and for later re-activating the current request. Further execution for the requesting processor's PLO instance is delayed until one or more prior PLO instruction instances in the chain complete their respective exclusive use(s) of the resource associated with the PLT blocking symbol. Another processor will set the H field in the requesting processor's CLE to the held state to re-activate the execution of the current PLO request.

At entry point B in FIG. 4, step 61 is entered to test the wait field in the current PLO request for a zero content. If it is not zero, the wait field contains a pointer to a next CLE in the chain, and path 63 is taken to step 64 which accesses the next CLE in the chain and examines its wait field. Step 65 makes the accessed CLE the current CLE in the CLE scan loop 66 as it branches back to step 61 to test the current CLE's wait field to determine if the scan loop 66 is to continue to another CLE in the chain. When step 61 finds a scanned CLE having a non-zero wait field, it ends the scan loop by taking path 62 to step 67, because the last CLE in any chain has a zero wait field. That last CLE will become the penultimate CLE when step 67 writes a pointer to the current request's CLE to replace the zero CLE, which now addresses the current processor's CLE (which now becomes the last CLE in the chain.) The CLE Scan Lock S (last set to hold state by step 14) is now released in step 68 by being set to the not-held state. The requesting processor tests its CLE's H field and remains in loop 71 as long as its H field is set to the not-held state.

At a later time, another processor (associated with the CLE containing a wait field pointer to the current request's CLE) will set the current request's CLE to the held state, which will be detected by the current processor when loop 71 enters step 69 to test the state of its H field. When its H field is found in the held state, step 69 reactivates the delayed current PLO instance by taking path 72 to step 73 which switches the processing of the current request to entry point A in FIG. 3, which operates as previously explained herein.

While we have described our preferred embodiments of our invention, it will be understood that those skilled in the art, both now and in the future, may make various improvements and enhancements which fall within the scope of the claims, which follow. These claims should be construed to maintain the proper protection for the invention first disclosed herein.

Having thus described our invention, what we claim as new and desire to secure by Letters Patent is:

1. A method of protecting the integrity of data stored in data resources in a computer system where the data is accessible to software instructions executing on plural processors in the computer system, comprising the steps of:

initiating execution of a current instruction instance by one of the processors (current processor) of a special type instruction for modifying data in a data resource specified by a blocking symbol in the current instruction instance,     specifying operands and a function code in the current instruction instance for accessing operand locations in the data resource in a manner specified by the function code, the operand locations not being required to be contiguous in the data resource,     storing a lock entry for each processor in the computer system capable of executing the special type instruction, and providing in each lock entry a lock field, a blocking symbol field and a waiting field,     copying the blocking symbol from the current instruction instance into the blocking symbol field of the lock entry (current lock entry) of the current processor executing the current instruction instance,     scanning by the current processor all other lock entries of the other processors to find any other lock entry having a lock field indicating a locked state while no other processor is allowed to access the lock entries, and     setting the lock field of the current lock entry to the lock state if no other lock entry is found to have a lock field set to a locked state to allow the current processor to have exclusive access to the data resource for completing execution of the current instruction instance.

2. A method of protecting the integrity of data stored in data resources in a computer system where the data is accessible to software instructions executing on plural processors in the computer system as defined in claim 1, further comprising the steps of:

scanning by the current processor all other lock entries of the other processors to find any other lock entry having a lock field indicating a locked state,     comparing the blocking symbol of the other lock entry with the blocking symbol of the current instruction instance, and     setting the lock field of the current lock entry to the locked state if no other lock entry which is found in the locked state by the scanning step is found by the comparing step to contain the blocking symbol of the current instruction instance, and allowing the current processor to have exclusive access to the data resource for completing execution of the current instruction instance.

3. A method of protecting the integrity of data stored in data resources in a computer system where the data is accessible to software instructions executing on plural processors in the computer system as defined in claim 2, further comprising the steps of:

the comparing step finding another lock entry with a locked state having a same blocking symbol equal to the blocking symbol of the current instruction instance,     checking a wait field of the another lock entry to determine if it contains a pointer to any other lock entry, and     if the wait field in the another lock entry does not contain any pointer, writing a new pointer in the wait field of the another lock entry for addressing the current lock entry to provide a chain of lock entries for the same blocking symbol, in which the another lock entry is a first lock entry and the current lock entry is a last lock entry in the chain.

4. A method of protecting the integrity of data stored in data resources in a computer system where the data is accessible to software instructions executing on plural processors in the computer system as defined in claim 3, further comprising the steps of:

if the wait field in the another lock entry is found to contain a pointer, accessing a further lock entry located by the pointer and examining a wait field in the further lock entry for any pointer therein, and     if the wait field in the further lock entry does not contain any pointer, writing a new pointer in the wait field of the further lock entry for addressing the current lock entry to provide a chain of lock entries for the same blocking symbol, in which the another lock entry is a first lock entry, the current lock entry is a last lock entry, and the further lock entry is between the first lock entry and the last lock entry in a sequence of lock entries in the chain.

5. A method of protecting the integrity of data stored in data resources in a computer system where the data is accessible to software instructions executing on plural processors in the computer system as defined in claim 4, further comprising the step of:

the scanning step tracing a chain of lock entries from the wait field in the first lock entry through pointers in wait fields in a plurality of further lock entries until a last accessed lock entry is found not having a pointer in its wait field, setting a wait field in the last accessed lock entry to a pointer for locating the current lock entry of the current processor of the current instruction instance, and setting the wait field in the current lock entry to indicate no pointer is contained therein.

6. A method of protecting the integrity of data stored in data resources in a computer system where the data is accessible to software instructions executing on plural processors in the computer system as defined in claim 4, further comprising the step of:

atomically accessing a scan lock for all of the lock entries, and setting the scan lock to a locked state prior to the current processor accessing any of the lock entries.

7. A method of protecting the integrity of data stored in data resources in a computer system where the data is accessible to software instructions executing on plural processors in the computer system as defined in claim 6, further comprising the step of:

setting the scan lock to an unlocked state when the current processor has not found any other lock entry in a hold state, or has found one or more other lock entries in hold state but not having the same blocking symbol.

8. A method of protecting the integrity of data stored in data resources in a computer system where the data is accessible to software instructions executing on plural processors in the computer system as defined in claim 4, further comprising the steps of:

using a pointer in a wait field of the first lock entry in a chain to access a next lock entry in the chain when the processor associated with the first lock entry completes processing of an instruction instance, and setting to a locked state the lock field in the next lock entry by operation of the processor associated with the first lock entry to enable the processor associated with the next lock entry to have exclusive access to the resource.

9. A method of protecting the integrity of data stored in data resources in a computer system where the data is accessible to software instructions executing on plural processors in the computer system as defined in claim 8, further comprising the steps of:

delaying the execution of each instruction instance associated with a lock entry having an unlocked state in a chain by the processor of each instruction instance continually testing the state of the lock field in the lock entry associated with the current processor until the lock field is found set to the locked state by another processor associated with the chain, and continuing execution of an instruction instance associated with a lock entry in the chain when the processor associated with the lock entry tests and finds the associated lock entry in the locked state.

10. A method of protecting the integrity of data stored in data resources in a computer system where the data is accessible to software instructions executing on plural processors in the computer system as defined in claim 4, further comprising the steps of:

performing by a processor all operations specified by a function code of an instruction instance on operands of the resource specified by the associated instruction instance when the processor detects a locked state for an associated lock entry in the chain.

prior to the processor accessing any lock entry, accessing a scan lock controlling a locking of all lock entries, and the processor atomically setting the scan lock to a locked state when the scan lock is available for obtaining for a processor an exclusive right to change any of the lock entries, and setting the scan lock to an unlocked state when the processor has completed scanning and changing the lock entries.

11. A method of protecting the integrity of data stored in data resources in a computer system where the data is accessible to software instructions executing on plural processors in the computer system as defined in claim 10, further comprising the step of:

when the processor has locked the scan lock after completing the performing step, the processor accessing the processor's lock entry to set its lock field to unlocked state and to invalidate the blocking symbol in its blocking symbol field.

12. A method of protecting the integrity of data stored in data resources in a computer system where the data is accessible to software instructions executing on plural processors in the computer system as defined in claim 11, while the processor is holding the scan lock in locked state, further comprising the steps of:

testing the state of a wait field in the processor's lock entry to determine if the wait field contains an existing pointer to a next lock entry in a chain of lock entries, accessing a next lock entry in the chain with any existing pointer, setting the lock field to locked state in the next lock entry, invalidating the pointer in the wait field of the processor's lock entry to remove the processor's lock entry from the chain, and releasing the scan lock by setting it to unlocked state to complete processing for the processor's lock entry.

13. A method of protecting the integrity of data stored in data resources in a computer system where the data is accessible to software instructions executing on plural processors in the computer system as defined in claim 12, further comprising the steps of:

initiating execution of a next instruction instance by the processor upon completion of the releasing step.

14. A method of protecting the integrity of data stored in a computer system when the data is accessible by execution of software instructions in programs executing on plural processors in the computer system as defined in claim 1, further comprising the step of:

locating all of the lock entries in a protected storage which cannot be addressed by software programs executing in the computer system.

15. A method of protecting the integrity of data stored in data resources in a computer system where the data is accessible to software instructions executing on plural processors in the computer system, comprising the steps of:

modifying data in one of the data resources by only using a special type instruction having a blocking symbol for representing the data resource, specifying operands and a function code in the special type instruction for changing content of operand locations in the data resource in a manner specified by the function code, the operand locations not being required to be contiguous in the data resource, associating a lock entry with each processor in the computer system capable of executing the special type instruction, and providing in each lock entry at least a lock field and a blocking symbol field, executing a current instruction instance of the special type instruction on any of the processors by initially copying the blocking symbol in the instruction instance into a blocking symbol field in the lock entry (current lock entry) associated with the processor, atomically locking by the processor of all lock entries, and scanning by the processor of other lock entries of other processors to determine if any other lock entry is locked and contains the same blocking symbol as the current lock entry, and atomically with the atomically locking and scanning steps setting the lock field to locked state in the current lock entry if the scanning step does not find any other lock entry to contain the same blocking symbol to enable the processor to have exclusive access to the data resource for the remainder of execution of the current instruction instance.

16. A method of protecting the integrity of data stored in a computer system when the data is accessible by execution of software instructions in programs executing on plural processors in the computer system as defined in claim 15, further comprising:

chaining all lock entries containing the same blocking symbol in an order in which processors associated with the lock entries request access to a resource associated with the same blocking symbol to execute a special instruction instance, and completing execution of each special instruction instance by a processor associated with each chained lock entry in the order that the lock entries are chained.

* * * * *